United States Patent [19]

Vasiliev et al.

[11] 4,114,015
[45] Sep. 12, 1978

[54] ELECTRIC DISCHARGE MACHINE WITH A PROGRAM COPIER AND A TOOL SUPPORT HEAD CARRIED BY A LONGITUDINALLY AND TRANSVERSELY DRIVEN CARRIAGE

[76] Inventors: Vladimir Sergeevich Vasiliev, Lomonoskovsky prospekt, 18, kv. 226; Ernest Alexandrovich Annenberg, ulitsa Shukhova, 16, korpus 4, kv. 31; Abram Lazarevich Livshits, Leninsky prospekt, 11, kv. 62; Vadim Evgenievich Polotsky, Leninsky prospekt, 70/11, kv. 238; Valery Mikhailovich Lakhtjukhov, Profsojuznaya ulitsa, 35/11, kv. 211, all of Moscow, U.S.S.R.

[21] Appl. No.: 780,357

[22] Filed: Mar. 23, 1977

Related U.S. Application Data

[63] Continuation of Ser. No. 579,722, May 21, 1975, abandoned.

[30] Foreign Application Priority Data

May 27, 1974 [SU] U.S.S.R. .............................. 2025822

[51] Int. Cl.² .............................................. B23P 1/08
[52] U.S. Cl. .............................................. 219/69 W
[58] Field of Search ............... 219/69 W, 69 M, 69 V, 219/69 G, 69 R, 125 PL; 51/165.8; 408/146, 186

[56] References Cited

U.S. PATENT DOCUMENTS

| | | | |
|---|---|---|---|
| 3,171,012 | 2/1965 | Morehead | 219/125 PL |
| 3,610,864 | 10/1971 | Kholodnou | 219/69 W |
| 3,612,810 | 10/1971 | O'Connor | 219/69 G |
| 3,614,372 | 10/1971 | Dulebohn | 219/69 G |
| 3,720,804 | 3/1973 | Kriz | 219/69 V |
| 3,731,043 | 5/1973 | Ullmann et al. | 219/69 W |
| 3,796,851 | 3/1974 | Pfaff | 219/69 M |

FOREIGN PATENT DOCUMENTS 240,140 6/1966 U.S.S.R.

*Primary Examiner*—Bruce A. Reynolds
*Attorney, Agent, or Firm*—Haseltine, Lake & Waters

[57] ABSTRACT

A metal-cutting machine comprising a base on which are mounted a table for clamping the workpiece being machined, and longitudinal ways for the carriage, including a longitudinal guide-bar which runs through a longitudinal open-end passage in the carriage and held in position by its ends to the machine base. The carriage has its own drive, and provision is made therein for a transverse open-end passage whose axis lies in a plane parallel with that of the axis of the aforesaid longitudinal passage, the transverse passage serving as the transverse ways for the cross guide-bar fitted therein, one of the ends of the guide-bar carrying the power head with the cutting tool, while its other end is kinematically associated with the other individual drive. The self-contained drives of the carriage and cross guide-bar are controlled from a program-copying device.

3 Claims, 7 Drawing Figures

ELECTRIC DISCHARGE MACHINE WITH A PROGRAM COPIER AND A TOOL SUPPORT HEAD CARRIED BY A LONGITUDINALLY AND TRANSVERSELY DRIVEN CARRIAGE

CROSS-RELATED APPLICATION

This application is a continuation of Ser. No. 579,722 filed May 21, 1975, abandoned.

FIELD OF THE INVENTION

The present invention relates to the art of machine-tool building and has particular reference to metal-cutting machines, wherein the cutting tool is displaced in two or more directions according to a preset program.

The present invention is applicable to best advantage in spark-erosion and electrochemical machining, as well as mechanical machining, such as drilling or milling.

BACKGROUND

Known in the art are metal-cutting machines (cf., e.g., USSR Inventor's Certificate No. 240,140), whose base mounts the table for clamping the workpiece being machined thereon, and longitudinal ways wherein the main carriage is mounted, provided with cross-ways for the cross-slide to traverse therealong, said cross-slide carrying the power head with the cutting tool. Both the main carriage and the cross-slide have each its own drive controlled from a program-copying device.

In such machines both the longitudinal and transverse ways are V-shaped, and are provided with balls enclosed in cages, which balls are fitted between the V-strips of each pair of the ways.

Initial loading of such ways is attained by appropriately forcing down one of the V-strips by means of adjusting screws.

A cardinal disadvantage inherent in said metal-cutting machines resides in the fact that such V-ways are intricately-shaped and features too large a length as compared to the cross-sectional area thereof, whereas the manufacturing accuracy of said V-ways, as well as the hardness of their surfaces contacting the balls, should be adequately high.

Besides, fitting faces must be provided on the base and carriage of a metal-cutting machine for mounting V-ways thereon said fitting faces being likewise imposed with high requirements as to the accuracy of their manufacture and mutual position, which in a majority of cases is attainable by resorting to mechanical fitting jobs.

All the afore-said disadvantages from which suffer V-shaped ways account for high labor consumption involved in their manufacture and, consequently, in the manufacture of a metal-cutting machine as a whole.

SUMMARY OF THE INVENTION

It is a primary object of the present invention to provide a metal-cutting machine provided with such ways for the main carriage and the cross-slide that makes it possible to greatly reduce the labor involved in their manufacture and the elimination of mechanical fitting jobs.

The above and other objects are attained in a metal-cutting machine whose base mounts a table for clamping the workpiece being machined, and longitudinal ways, wherein a main carriage is mounted, said carriage having transverse ways for a cross-slide to travel therealong, said cross-slide carrying a power head with cutting tool, both said main carriage and said cross-slide each having its own drive controlled from a program-copying device. According to the invention, used in the capacity of said longitudinal ways in the herein-proposed metal-cutting machine is a longitudinal guide-bar which runs through a longitudinal open-end passage provided in the main carriage and is made fast with its end in the machine base, whereas in the capacity of said transverse ways for said cross-slide, use is made of a transverse open-end passage provided in the main carriage in such a manner that its axis lies in a plane parallel with that of said longitudinal passage, said transverse passage accommodating a cross guide-bar serving as said cross-slide and carrying at one of its ends said power head and at the other end, a cross-arm fixed in position thereon perpendicular to with the axis of said cross guide-bar and kinematically associated with the self-contained drive of said cross-slide.

Such an embodiment of the longitudinal and transverse ways and the surfaces conjugated therewith (viz., in the form of guide-bars/cylindrical rods/and cylindrical passages featuring a more favorable ratio between their length and cross-sectional area makes it possible to impart high rigidity to such ways, minimize deformations due to heat-treatment and ensure precision accuracy of manufacturing the conjugated surfaces, while reducing the labor requirement of the entire production process and employs simpler production equipment without resorting to manual correction or retouching jobs.

It is expedient that a linear antifriction bearing be provided between each of the guide-bars and the wall of the respective passage in the main carriage.

Such an embodiment makes it possible to carry out axial traversing of the main carriage and the cross guide-bar with minimum forces applied, as well as to establish preloading of the "guide-bar-to-passage" joints due to the size of the guide-bars.

According to one of the embodiments of the present invention, kinematic association of the cross-arm carried by the cross guide-bar with the self-contained drive may be accomplished by means of a screw-and-nut drive, wherein the screw is parallel with the axis of the cross guide-bar and with one of its ends interconnected with the output shaft of the drive located on the main carriage on the same side of the cross-arm as the cross guide-bar, whereas the nut of said screw-nut drive is held in position on the cross-arm.

Such an embodiment makes it possible to greatly reduce the floor dimensions of the machine.

It is likewise expedient that provision be made for two extra guide-bars, each arranged in parallel with the longitudinal and transverse guide-bars, one of which extra guide-bars is locked in place with its ends to the machine base, and the other, to the main carriage, each of said extra guide-bars being adapted to interact with a pair of rollers whose shafts are mounted on the main carriage and the cross-arm, respectively.

Such an embodiment makes it possible to avoid rotation of the main carriage relative to the longitudinal guide-bar and that of the cross guide-bar with respect to the main carriage, thus ensuring reliable machine operation.

BRIEF DESCRIPTION OF THE DRAWINGS

Given below is a detailed disclosure of the present invention according to one of the embodiments thereof in conjunction with the accompanying drawings, wherein.

DETAILED DESCRIPTION

Figure 1:
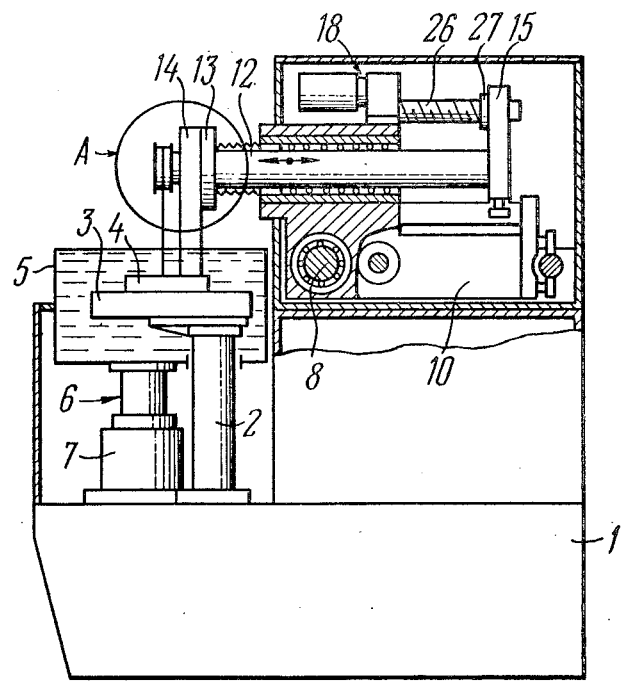
FIG. 1 is a schematic side-elevation view partially cutaway and in section of a metal-cutting machine, according to the invention.
Figure 2:
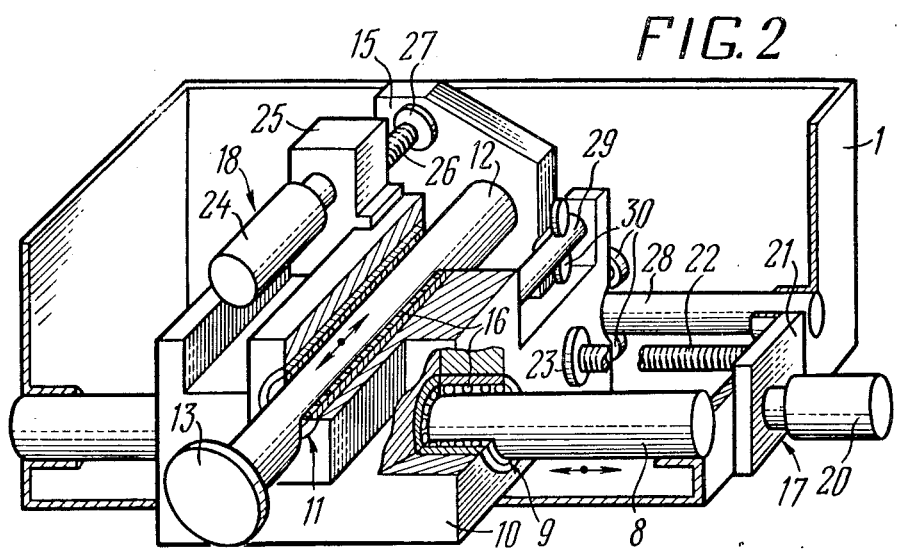
FIG. 2 is a perspective view of the machine of FIG. 1 showing the main carriage with the longitudinal and cross guide-bars.

Described hereinbelow as an exemplary metal-cutting machine, according to the invention, is a spark-erosion machine comprising a base 1 (FIGS. 1 and 2) which carries a column 2, whereon a table 3 is mounted, serving for clamping a workpiece 4 within the machining zone.

The table 3 is accommodated inside a bath 5 serving as the tank for process fluid, said bath being mounted on a screw elevator 6 located on the base 1 and provided with a self-contained drive 7, which raises and lowers the bath 5.

The base 1 carries also longitudinal ways of which, according to the invention comprises a longitudinal guide-bar 8 which runs through a longitudinal open-end passage 9 provided in a solid-design main carriage 10, and with its ends is fixed in position in the base 1 of the machine.

The main carriage 10, in turn, has transverse ways for a cross-slide, said transverse ways, according to the invention, being made as a transverse open-end passage 11 provided in the main carriage 10 in such a manner that its axis lies in a plane perpendicular to that of the axis of the longitudinal passage 9.

The transverse passage 11 accommodates a cross guide-bar 12 serving as the cross-slide. A flange 13 is provided at the end of the cross guide-bar 12 facing the table 3 for attaching detachable power heads 14 thereon, which carry various-purpose cutting tools. In the herein-considered particular embodiment of the invention, use is made of a yoke for spark-erosion machining of the workpiece 4, as a power head.

A cross-arm 15 is fixed in position at the end of the cross guide-bar 12 opposite the power head 14, the arm 15 extending perpendicular to the axis of said guide-bar, according to the invention.

A linear antifriction bearing 16 is fitted between each of the guide-bars 8 and 12 and the inside wall of the respective passages 9 and 11 in the main carriage 10.

Figure 3:
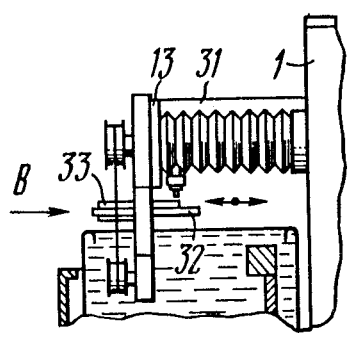
FIG. 3 is an enlarged-scale view of detail "A" in FIG. 1.
Figure 4:
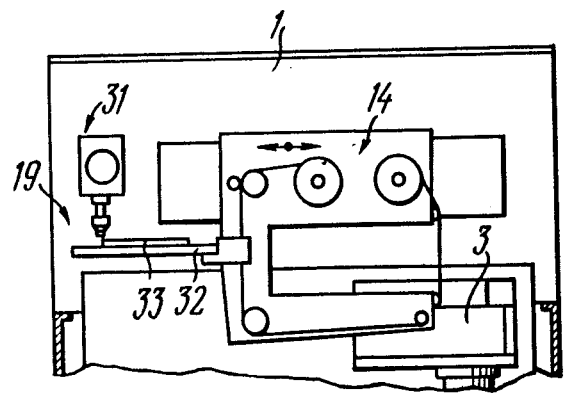
FIG. 4 is a view taken in the direction of arrow "B" in FIG. 3.

The main carriage 10 and the cross guide-bar 12 each has its own drive (17 and 18, respectively) controlled from a program-copying device 19 (FIGS. 3 and 4).

The drive 17 of the main carriage 10 is mounted on the base 1 and incorporates a motor 20 and a speed reducer 21 whose output shaft is interconnected with the main carriage 10 through a screw-and-nut drive 22, 23 in such way that a screw 22 of said drive is arranged parallel with the axis of the longitudinal guide-bar 8 in a respective recess made in the main carriage 10, while nut 23 is held in place in the latter.

The drive 18 of the cross guide-bar 12 is mounted on the main carriage 10 on the same side of the cross-arm 15 as the cross guide-bar 12, and has a motor 24 and a speed reducer 25 whose output shaft is interconnected, through another screw-and-nut drive, 26, 27 with the cross-arm 15 locked in place on the cross guide-bar 12, screw 26 of said latter screw-and-nut drive being arranged parallel with the axis of the cross guide-bar 12, while nut 27 is fixed in position in the cross-arm 15.

The arrangement of the cross guide-bar 12 and its drive 18 on the same side of the cross-arm 15 makes it possible to greatly reduce the floor dimensions of the machine and thus make it more space-saving.

To ensure against rotation of the main carriage 10 relative to the longitudinal guide-bar 8 and that of the cross guide-bar 12 with respect to the main carriage 10, extra guide-bars 28 and 29 are located, respectively parallel with the guide-bars 8 and 12, the guide-bar 28 being fixed in position with its ends in the base 1, while the guide-bar 29 is fixed at its ends in the main carriage 10, and a pair of rollers 30 is adapted to interact with each of the guide-bars 28 and 29, said rollers embracing the respective guide-bars 28 and 29 and having their shafts mounted on the main carriage 10 and the cross-arm 15, respectively.

The program-copying device 19 controlling the drive 17 of the main carriage 10 and the drive 18 of the cross guide-bar 12, is electrically connected with their respective motors 20 and 24. In the case of a tracer model, the program-copying device 19 is provided with a readout unit 31 (FIGS. 3 and 4) of any heretofore known design which is mounted on the machine base 1, and a stage 32 carrying a copying templet 33 is clamped on the flange 13 (FIG. 2) of the cross guide bar 12, wherein attached is also the power head 14 with the cutting tool.

In a spark-erosion machine, the program-copying device 19 is used in conjunction with the power head 14 made as a cutout spark-erosion yoke of any known design.

Figure 6:
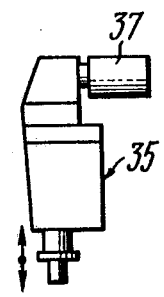
FIGS. 5 to 7 illustrate exemplary typical power heads.
Figure 7:
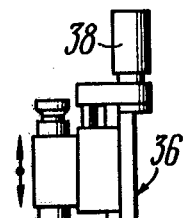
Figure 5:
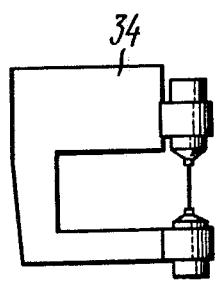

Whenever necessary the herein-considered metal-cutting machine may use other power heads carrying a variety of cutting tools, such as a power head 34 (FIG. 5) for electrochemical diamond treatment of workpieces, as well as power heads 35 (FIG. 6) and 36 (FIG. 7) for mechanical treatment, such as milling or drilling, which renders the machine more versatile. Additionally, the power heads 35 and 36 may have self-contained drives 37 and 38 for feeding the cutting tool along the axis of application (Z-axis).

The spark-erosion machine according to the invention operates as follows.

The workpiece 4 being machined is clamped on the table 3, while the bath 5 is raised by means of the screw elevator 6 and filled with process fluid to the level at which the workpiece 4 is fully submerged therein.

Before starting operation, the power head 14, viz., yoke for spark-erosion machining, and the stage 32 with the copying templet 33 are fixed to the flange 13 of the cross guide-bar 12, while the readout unit 31 is mounted on the machine base 1.

Then the power head 14 is displaced in the two mutually perpendicular directions, i.e., longitudinal and transverse directions in a horizontal plane according to the program preset by the program-copying device 19 (FIGS. 3 and 4) through the motor 20 of the drive 17 of the main carriage 10 and through the motor 24 of the drive 18 of the cross guide-bar 12.

In this case, rotation from the shaft of the motor 20 is transmitted through the speed reducer 21 to the screw 22 which either turns into or out of the nut 23 to displace the main carriage 10 along the longitudinal guide-bar 8 with respect to the base 1.

In a similar manner the motor 24 transmits motion through the speed reducer 25, the screw 25 and the nut 27 to the cross-arm 15 and alongside with the latter, to the cross guide-bar which travels along the transverse passage 11 of the main carriage 10, with the result that the power head 14 carried by the guide-bar 12 performs machining of the workpiece 4 along the outline preset by the copying templet 33. The program-copying device 19 operates similarly to any known devices of that type.

In the course of operation of the metal-cutting machine according to the invention, the main carriage is held against rotation with respect to the longitudinal guide-bar 8 due to the provision of the pair of rollers 30 mounted on the main carriage 10 and embracing the extra guide-bar 28, while the cross guide-bar 12 is held against rotation in the passage 11 of the main carriage 10 by the other pair of the rollers 30 mounted on the cross-arm 15 of the cross guide-bar 12 and embracing the extra guide-bar 29.

What we claim is:

1. A metal-cutting machine comprising a base; a table mounted on said base for clamping a workpiece thereon; longitudinal ways on said base; a main carriage mounted on said longitudinal ways for longitudinal displacement thereon, said main carriage being provided with transverse ways; a cross-slide mounted in the transverse ways of said main carriage; a power head with cutting tool mounted on said cross-slide; first and second drive means for respectively driving said main carriage and cross-slide with respect to their associated ways, said second drive means being mounted on said main carriage adjacent to said main carriage; a program-copying device connected to said first and second drive means to control the same and thereby the driving of the main carriage and cross-slide, said longitudinal ways comprising a horizontal longitudinal guide-bar extending through a longitudinal passage provided in said main carriage and having ends fixed to said base, said transverse ways being constituted by a transverse passage provided in the main carriage with its axis horizontal and in a plane perpendicular to the axis of said longitudinal passage in the main carriage, said cross-slide including a horizontal cross guide-bar displaceably mounted in said transverse passage and having one end secured to said power head, a cross-arm secured to the other end of said cross guide-bar and extending perpendicularly to the axis of said cross guide-bar and means operatively coupling said cross-arm to said second drive means for the cross-slide comprising a screw-and-nut drive including a drive motor, means slidably mounting said drive motor on said main carriage for travel parallel to said cross guide-bar, a screw arranged parallel to the axis of the cross guide-bar with one of its ends drivingly connected to said drive motor, said screw being located on the main carriage on the same side of the cross-arm as the cross guide-bar, and a nut fixed in position on the cross-arm and engaged by said screw, said drive motor of the second drive means being superimposed above said cross guide-bar at an intermediate location along the length thereof and also above said longitudinal ways on said base and being confined within the outline of the carriage, said screw extending the length from the drive motor of the second drive means to said cross arm which represents only a portion of the length of said cross guide-bar.

2. A machine as claimed in claim 1 comprising linear anti-friction bearings fitted between each of the guide-bars and the wall of the respective passage in the main carriage.

3. A machine as claimed in claim 2 comprising two further guide-bars respectively arranged parallel to said longitudinal and said transverse guide-bars, the former of said further guide-bars being fixed at its ends to said base, while the latter of said further guide-bars is fixed to the main carriage, a pair of rollers engaged with each of said further guide-bars, and shafts for said rollers mounted respectively on the main carriage and on the cross-arm.

* * * * *